(12) United States Patent
Jacob

(10) Patent No.: US 7,296,263 B1
(45) Date of Patent: Nov. 13, 2007

(54) METHOD AND SYSTEM FOR PERFORMING OPERATIONS ON DATA USING XML STREAMS

(75) Inventor: Arun T. Jacob, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 590 days.

(21) Appl. No.: 10/318,649

(22) Filed: Dec. 12, 2002

(51) Int. Cl.
*G06F 9/45* (2006.01)
*G06F 3/00* (2006.01)
*G06F 16/15* (2006.01)

(52) U.S. Cl. .................. 717/143; 717/107; 717/136; 717/147; 715/760; 715/513; 709/246

(58) Field of Classification Search ............ 717/107, 717/136, 143, 147; 715/760, 513; 709/246
See application file for complete search history.

(56) References Cited

U.S. PATENT DOCUMENTS

| | | | |
|---|---|---|---|
| 6,330,574 B1* | 12/2001 | Murashita | 715/513 |
| 6,883,137 B1* | 4/2005 | Girardot et al. | 715/513 |
| 7,080,314 B1* | 7/2006 | Garofalakis et al. | 715/500 |
| 7,089,491 B2* | 8/2006 | Feinberg et al. | 715/522 |
| 2002/0087571 A1* | 7/2002 | Stapel et al. | 707/100 |
| 2002/0087744 A1* | 7/2002 | Kitchin | 709/331 |
| 2002/0099829 A1* | 7/2002 | Richards et al. | 709/227 |
| 2003/0212954 A1* | 11/2003 | Patrudu | 715/513 |
| 2004/0015463 A1* | 1/2004 | Herrera et al. | 706/47 |
| 2004/0015783 A1* | 1/2004 | Lennon et al. | 715/523 |
| 2004/0123277 A1* | 6/2004 | Schrader et al. | 717/143 |
| 2004/0133605 A1* | 7/2004 | Chang et al. | 707/104.1 |
| 2004/0215665 A1* | 10/2004 | Edgar et al. | 707/200 |

OTHER PUBLICATIONS

Carlisle, David; "OpenMath, MathML, and XSL", Jun. 2000, ACM SIGSAM Bulletin, V 34, Issue 2, retrieved from ACM Portal Feb. 21, 2006.*
Suzuki, Junichi; "Managing the software design documents with XML", Sep. 1996, Proceedings of the 16th annual international conference on Computer docum, ACM Portal Feb. 21, 2006.*
Weiss, Aaron; "XML gets down to business", Sep. 1999, netWorker, V 3, Issue 3, ACM Press, ACM Portal Feb. 21, 2006.*

* cited by examiner

*Primary Examiner*—Mary Steelman
(74) *Attorney, Agent, or Firm*—Merchant & Gould, P.C.

(57) ABSTRACT

The present invention provides a method and system for performing operations on data using XML streams. An XML schema defines a limited set of operations that may be performed on data. These operations include addition, subtraction, multiplication and division. The operations are placed in an XML stream that conforms to the XML schema. The XML stream may perform one or more of the defined operations on the data. The limited set of operations allows data to be validated and processed without excessive overhead.

22 Claims, 5 Drawing Sheets

METHOD AND SYSTEM FOR PERFORMING OPERATIONS ON DATA USING XML STREAMS

FIELD OF THE INVENTION

This invention relates generally to computer software, and more particularly to a schema for data processing tools.

BACKGROUND OF THE INVENTION

Extensible Markup Language (XML) has gained wide popularity in recent years, especially in the field of Web development. XML is a universal language that provides a way to identify, exchange, and process various kinds of data. For example, XML is used to create documents that can be utilized by a wide variety of computer application programs. On the Internet, for example, information and data may be distributed among incompatible information repositories using XML. XML provides a mechanism for exchanging data with these entities in a mutually understood fashion.

When passing data between programs, instructions in an XML document may be implemented as an XML stream. An XML stream may contain XML instructions to act on the data. Implementing XML instructions as an XML stream allows the instructions to be transmitted between two locations using a network, such as a Local Area Network (LAN) or the Internet.

An XML schema may be used to define an XML stream. An XML schema comprises of a set of rules written in XML that define the structure of an XML stream. For example, an XML schema may define data types, which may be associated with XML element types and attributes. An XML schema may also describe the structure and constrain the contents of XML streams.

Conventional XML schemas, however, add overhead to an XML stream that transmits data between locations. This overhead causes the XML stream to be transmitted and interpreted slower than what may be desired.

SUMMARY OF THE INVENTION

The present invention is directed towards providing a method and system for performing operations on data using XML streams. An XML schema defines a limited set of operations that may be performed on the data.

According to one aspect of the invention, the operations are restricted by the XML schema and include defined operations for addition, subtraction, multiplication and division. The operations are placed in an XML stream that conforms to the XML schema.

According to another aspect of the invention, the operations defined by the schema are performed on the data by an operation parser. Both the data and the XML stream are passed to an operation parser for performing the desired operations. The parser then performs the operations on the data utilizing the XML stream.

According to another aspect of the invention, the operations are performed on two operands related to the data. The operands may be of the types that are defined by the XML schema. The element types include operations, data, dataset, and real numbers.

According to yet another aspect of the invention, the XML schema provided reduces overhead in performing operations on the data. The overhead is reduced in part because the XML schema restricts the number of operations that may be included in the XML stream so that the operation parser may rapidly interpret and implement the stream.

These and various other features, as well as advantages that characterize the present invention, will be apparent from a reading of the following detailed description and a review of the associated drawings.

DETAILED DESCRIPTION OF THE PREFERRED EMBODIMENT

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

This invention is directed toward a method and system for performing operations on data using an XML stream that includes a limited number of operations defined by an XML schema.

Illustrative Operating Environment

Figure 1:
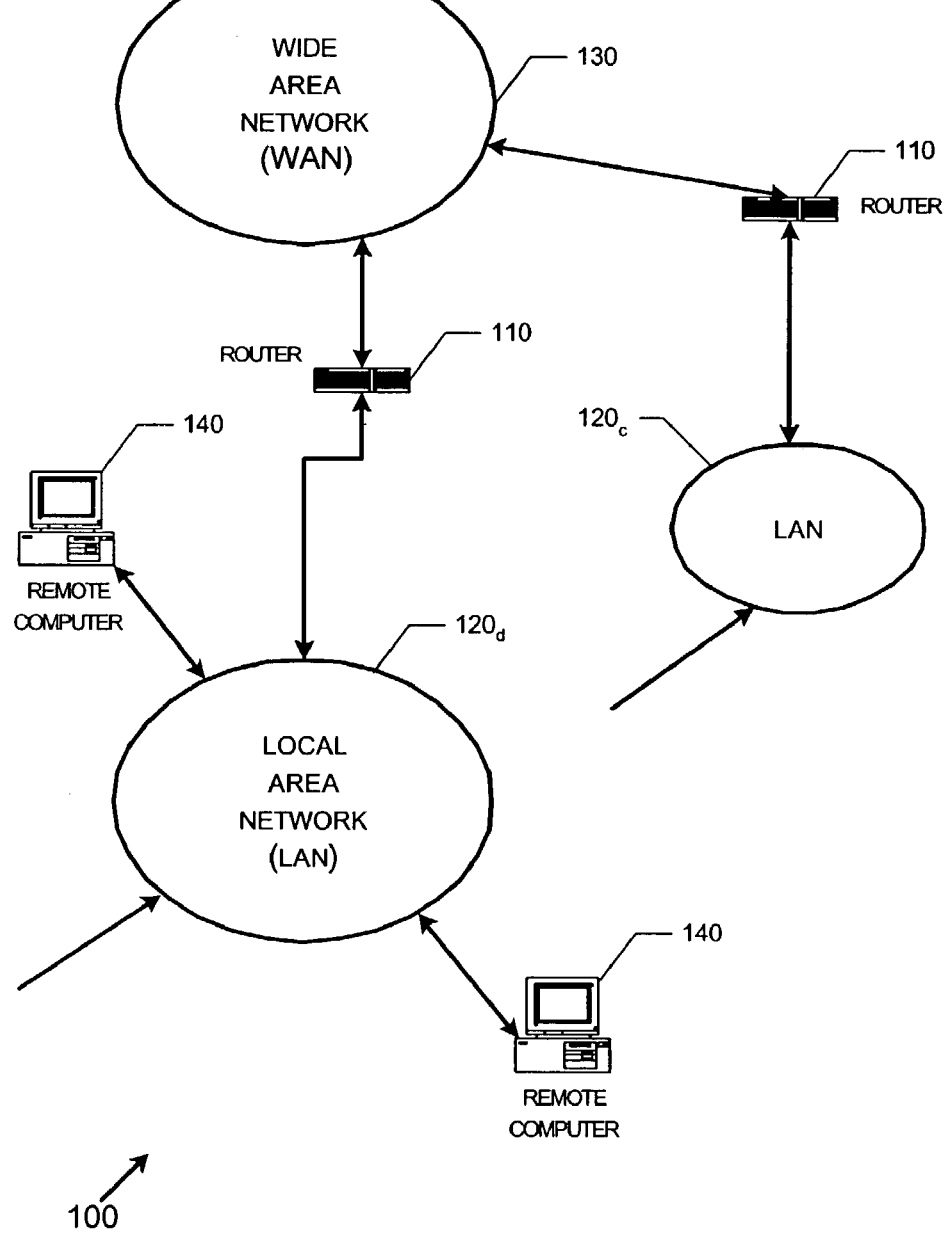
FIGS. 1-3 show components of an exemplary environment in which the invention may be practiced.
Figure 2:
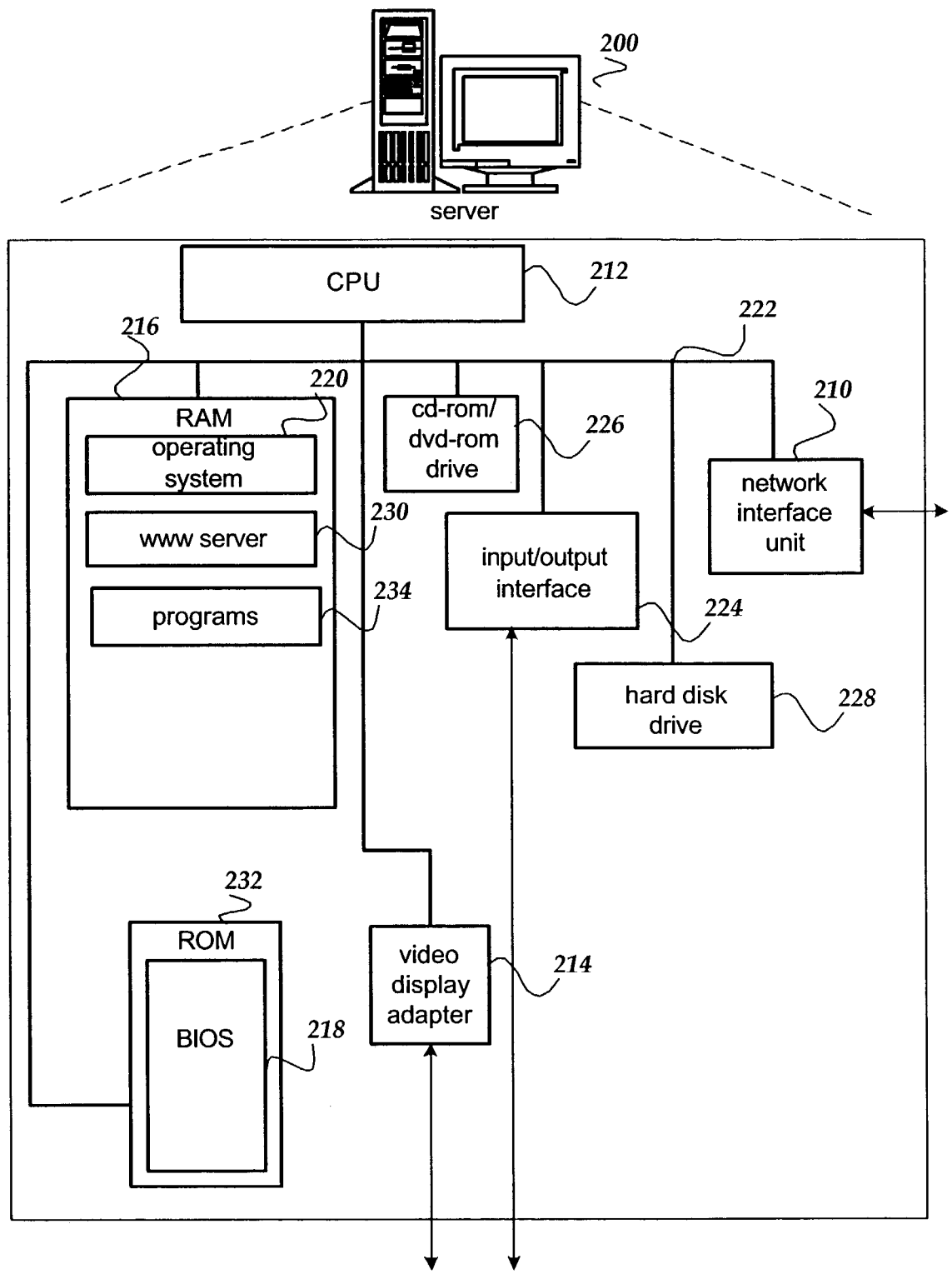
Figure 3:
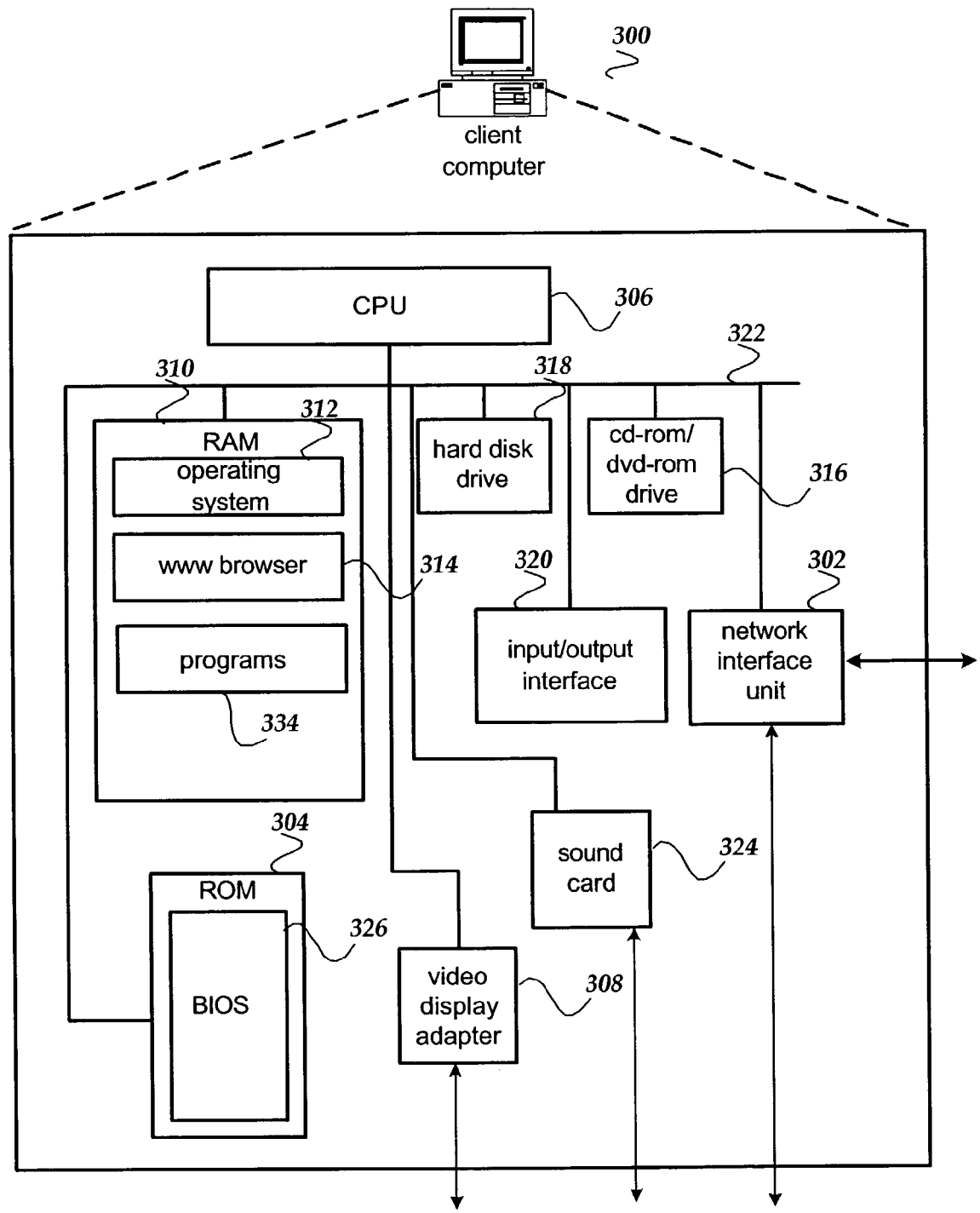

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows a plurality of local area networks ("LANs") 120$_{a-d}$ and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs (including those based on differing architectures and protocols), a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs 120$_{a-d}$ or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational and other computer systems, that route data and messages. An embodiment of the invention may be practiced over the Internet.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language), XML, or some other markup language, identified by URLs (Uniform Resource Locators) that specify the particular machine and pathname by which a file can be accessed, and transmitted from server to end user using HTTP.

A server providing a WWW site, as the server described in more detail in conjunction with FIG. 2, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network.

Server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. A general purpose server operating system, such as UNIX, LINUX™, or Microsoft WINDOWS NT®, and the like may be used. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. XML may be interpreted by server 200. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 may also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

FIG. 3 depicts several components of client computer 300. Client computer 300 may include many more components than those shown in FIG. 3. However, it is not necessary that those generally-conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Client computer 300 also includes BIOS 326, processing unit 306, video display adapter 308, sound card 324, and memory. The memory generally includes RAM 310, ROM 304 and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, sound card 324, and input/output interface 320 are all connected to processing unit 306 via bus 322. Other peripherals may also be connected to processing unit 306 in a similar manner.

As will be recognized from the discussion below, aspects of the invention may be embodied on routers 110, on server 200, on client computer 300, on other network devices (not shown), or on some combination of the above. For example, programming steps may be contained in programs 334 and/or programs 234.

Illustrative Data Operations

Figure 4:
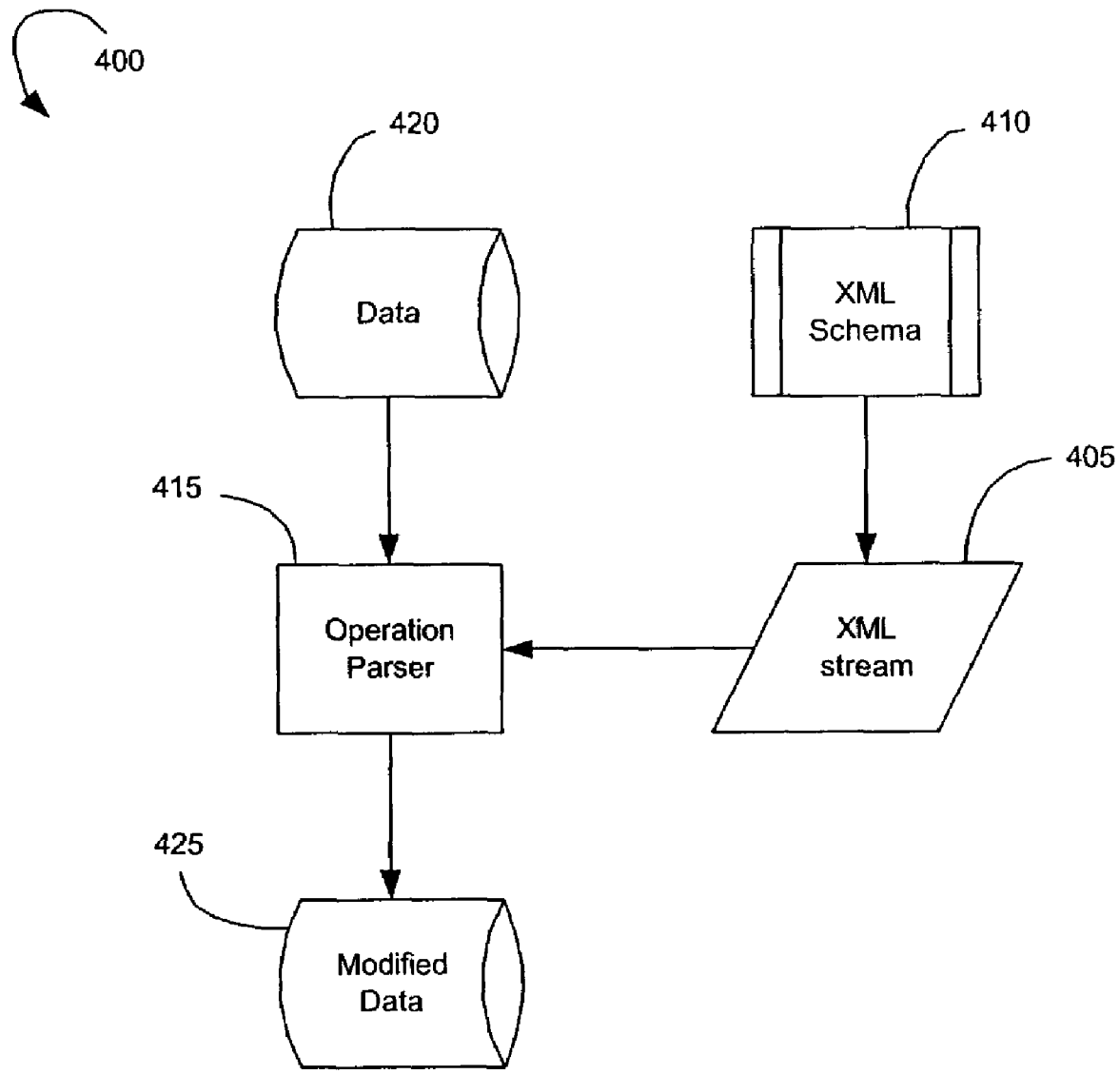
FIG. 4 shows a schematic diagram of an operational process where operations are performed on a data by an XML stream.

FIG. 4 shows a schematic overview diagram of operational process 100 where operations are performed on data by an XML stream. An XML stream is a flow of data containing instructions in XML. XML stream 405 may contain instructions for performing one or more operations from a set of pre-defined operations. The data types, structure, and contents of XML stream 405 are specified by XML schema 410. Briefly stated, XML schema 410 includes rules written in XML that define operations that may be included in XML stream 405. XML schema 410 includes a limited number of defined operations that may be performed, including addition, subtraction, multiplication, and division. XML schema 410 will be explained in more detail in conjunction with reference to FIG. 5.

One or more operations defined by XML schema 410 may be placed in XML stream 405. Operation parser 415 receives data from data 420 and at least one operation from the defined operations within XML stream 405. Operation parser 415 performs the operations contained within XML stream 405 on data 420. Data 420 may be in many different forms. For example, data 420 may be a single data point, or a set of data points. Additionally, the data may be of various types, including but not limited to: real numbers, integers, pointers, strings, and operations. Operation parser 415 operates on data 420 utilizing XML stream 405 and outputs modified data 425. Modified data 425 is modified in accordance with the instructions contained within XML stream 405. Modified data 425 may then be used by another process (not shown).

XML stream 405 and data 420 may be passed to operation parser 415 at any time. According to one embodiment, XML stream 405 and data 420 is passed to operation parser 415 at predetermined times. For example, operation parser acts on the data every 50 milliseconds. According to another embodiment, XML stream 405 is passed to operation parser 115 when data 420 is received by operation parser 415.

Figure 5:
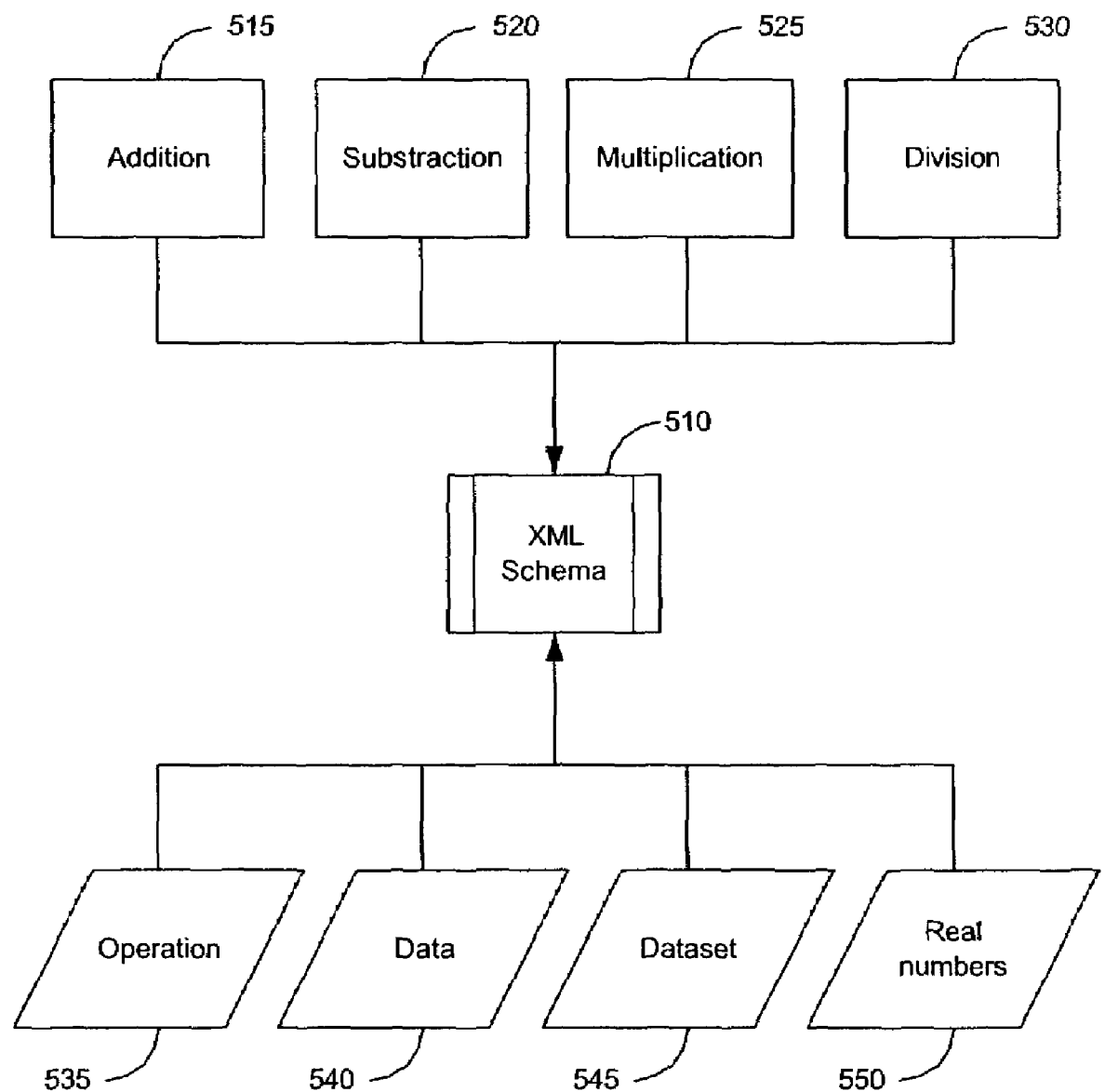
FIG. 5 illustrates a schematic diagram of exemplary contents of the XML schema shown in FIG. 4; in accordance with aspects of the invention.

FIG. 5 illustrates a schematic diagram of an exemplary XML schema 410 as shown in FIG. 4. XML schema 410 is used to describe data types, structure, and contents of XML stream 405. As illustrated, XML schema 410 includes definitions for four types of operations, including: addition 515, subtraction 520, multiplication 525, and division 530. XML schema 410 also includes definitions for four types of elements: data 540, dataset 545, operation 535, and real number 550. Data 540 is a single unit of data and datasets 545 is a set of data that contains multiple units of data, such as a data array. Data 540 and dataset 545 will be discussed in more detail in conjunction with TABLES 2, 3, and 4 below. Operation 535 performs one of the four types of operations. These operations may be performed on the four element types. Operation 535 will be discussed in more detail in conjunction with TABLES 5 to 10. TABLE 1 shows a block of code in an exemplary XML schema for defining a primary set of arithmetic operations in an XML stream, such as XML stream 405 of FIG. 1. The code block in TABLE 1 defines operations that may be performed on data using the XML stream. These operations include addition, subtraction, multiplication, and division. The operations that may be included in the XML stream are restricted to the four operations. This restriction, which limits the content of the XML stream, allows the stream to be efficiently validated and rapidly performed.

TABLE 1

Primary set of arithmetic operations.

```
<xsd:simpleType name="kindofOperationDef">
    <xsd:restriction base="xsd:string">
        <xsd:pattern value="addition"/>
        <xsd pattern value="subtraction"/>
        <xsd:pattern value="multiplication"/>
        <xsd:pattern value="division"/>
    </xsd:restriction>
</xsd:simpleType>
```

TABLE 2 shows a block of code in an exemplary XML schema for defining the data element type. The term "data element type" includes a single unit of data. The code block in TABLE 2 defines the data element type as a number string.

TABLE 2

Definition for data element type.

```
<xsd:simpleType name="dataIDDef">
    <xsd:restriction base="xsd:string">
        <xsd:pattern value="\p{Nd}+"/>
    </xsd:restriction>
</xsd:simpleType>
```

TABLE 3 illustrates a block of code in an exemplary XML schema for defining the dataset element type. The term "dataset element type" includes a set of data, such as a data array, that contains multiple units of data. The code block in TABLE 3 specifies the type of pre-operations that may be applied to the units of data within the dataset prior to operating on the dataset as a whole. These pre-operations include addition, subtraction, multiplication, and division. Furthermore, the code block in TABLE 3 specifies the types of data that may be included within the dataset element type. The units of data within a dataset element type are of the data element type, which includes a string with numbers.

TABLE 3

Definition for dataset element type.

```
<xsd:complexType name="dataIDSetDef>
    <xsd:sequence>
        <xsd:element name="setOperation" type="kindofOperationDef"/>
        <xsd:element name="setMember" type="dataIDDef" maxOccurs="unbounded"/>
    </xsd:sequence>
</xsd:complexType>
```

TABLE 4 illustrates a block of code in an exemplary XML schema for specifying an alternative to the dataset element type that was defined by the code block shown in TABLE 3. The code block in TABLE 4 specifies that the pre-operations of the dataset element type include the operations defined by the code block shown in TABLE 1. However, unlike the code block in TABLE 3, the code block of TABLE 4 restricts the type of pre-operation to addition.

TABLE 4

Definition for an alternative dataset element type.

```
<xsd:complexType name="summedDataIDSetDef">
    <xsd:complexContent>
        <xsd:restriction base="dataIDSetDef">
            <xsd:sequence>
                <xsd:element name="setMember" typedataIDDef"/>
            </xsd:sequence>
        </xsd:restriction>
    </xsd:complexContent>
</xsd:complexType>
```

TABLE 5 summarizes the possible types of operations that may be carried out by an exemplary operation (O1) on different operand combinations. An operand contains data on which an operation may operate. An operation may be defined to operate on one or more operands. According to one embodiment of the invention, the operation is performed on two operands. As shown in TABLE 5, the types of operations that may be performed by operation O1 include addition, subtraction, multiplication, and division. TABLE 5 also lists the various types of operand combinations that are accepted by operation O1. As defined, operation O1 may operate on two operands, which may be of four different element types: data, dataset, operations, and real numbers. For example, the first operand may be data a, dataset A, operation O2, or real number R1; the second operand may be data b, dataset B, operation O2, or real number R2.

TABLE 5

Summary of operand combinations.

| Operand Combinations | Addition | Subtraction | Multiplication | Division |
|---|---|---|---|---|
| O1(a,b) | X | X | X | X |
| O1(A,B) | X | X | X | X |
| O1(O2,O3) | X | X | X | X |
| O1(R1,R2) | X | X | X | X |
| O1(a,B) | X | X | X | X |
| O1(a,O3) | X | X | X | X |
| O1(a,R2) | X | X | X | X |
| O1(A,b) | X | X | X | X |
| O1(A,O3) | X | X | X | X |
| O1(A,R2) | X | X | X | X |
| O1(O2,b) | X | X | X | X |
| O1(O2,B) | X | X | X | X |
| O1(O2,R2) | X | X | X | X |
| O1(R1,b) | X | X | X | X |
| O1(R1,B) | X | X | X | X |
| O1(R1,O2) | X | X | X | X |

TABLES 6 to 10 show exemplary blocks of code in an XML schema for specifying an operation and different types of operands that may be accepted by the operation.

The code block in TABLE 6 specifies the operation to include addition, subtraction, multiplication, and division. The code block also includes an example sequence for defining a combination of two operands. A sequence specifies two operands that may be operated on by the operation. The sequence specifies that both operands be of data element type. As discussed above, data element type may be a string that has characters that are restricted to numbers. As indicated in TABLE 6, additional sequences with operands of other element types may be included in the code block. Four other exemplary sequences in the context of the code block in Table 6 are shown in TABLES 7, 8, 9 and 10 below.

TABLE 6

Define operations with two data element type operands.

```
<xsd:element name="kindofOperation" type="kindofOperationDef"/>
<xsd:element name="OperationElement" type="dataIDDef"/>
<xsd:element name="OperationSet" type="summedDataIDSetDef"/>
<xsd:element name="SubOperation" type="operationDef"/>
<xsd:element name="Real" type="xsd:double"/>
<xsd:complexType name="operationDef">
  <xsd:sequence>
    <xsd:element ref="kindofOperation"/>        <xsd:choice>
(Choices of operand combinations are shown in Table 5 above. Specific
examples are elaborated below.)
    </xsd:choice>
  </xsd:sequence>
</xsd:complexType>
```

TABLE 7 shows an exemplary sequence that specifies a combination of two operands where both operands are data elements. The sequence specifies the dataset elements as the type that was defined by the code block in TABLE 2

TABLE 8

Define operations with two data element type operands.

```
<xsd:sequence>
    <xsd:element ref="OperationElement"/>
    <xsd:element ref="OperationElement"/>
</xsd:sequence>
```

TABLE 8 shows an exemplary sequence that specifies a combination of two operands where both operands are summed dataset elements. The sequence specifies the dataset elements as the type that was defined by the code block in TABLE 4, where the pre-operation of the dataset element is restricted to addition.

TABLE 8

Define operations with two dataset element type operands.

```
<xsd:sequence>
    <xsd:element ref="OperationSet"/>
    <xsd:element ref="OperationSet"/>
</xsd:sequence>
```

TABLE 9 shows an exemplary sequence that specifies a combination of two operands where both operands are operation elements. The sequence specifies the operation element as the type that is defined by the code block in TABLE 6

TABLE 9

Define operations with two operation element type operands.

```
<xsd:sequence>
    <xsd:element ref="SubOperation"/>
    <xsd:element ref="SubOperation"/>
</xsd:sequence>
```

TABLES 10 and 11 show two exemplary sequences that specify two operand combinations. The sequence in TABLE 10 specifies a combination of two operands where both operands are real numbers. TABLE 11 shows a sequence that specifies a combination where the first operand is a data element and the second operand is a real number. Other combinations of operands, as indicated in TABLE 5, may be specified by sequences similar to those shown in TABLES 7, 8, 9, 10, and 11.

TABLE 10

Define operations with two real number element type operands.

```
<xsd:sequence>
    <xsd:element ref="Real"/>
    <xsd:element ref="Real"/>
</xsd:sequence>
```

TABLE 11

Define operations one data element type operand and one real number element type operand.

```
<xsd:sequence>
    <xsd:element ref="OperationElement"/>
    <xsd:element ref="Real"/>
</xsd:sequence>
```

TABLE 12 shows a block of code that defines the top-level container element of the XML schema. The top-level container element includes sub-elements that are groups of operations, where the operations are defined by the code block shown in TABLE 6. Groups of operations are summations of all of their sub elements. The fact that they are summations is implicit in the group definition, and is referred to in the name of the element.

TABLE 12

Validation.

```
<xsd:complexType name="summedOperationGroupDef">
    <xsd:sequence>
        <xsd:element name="operationGroupElement" type="operationDef"
            maxOccurs="unbounded"/>
    </xsd:sequence>
</xsd:complexType>
```

TABLE 13 illustrates an exemplary XML stream for performing an operation "DataID 1011+DataID 1211." The stream specifies that addition is the type of the operation to be performed. In order to be valid the OperationGroupElement tag of this stream is included in a SummedOperationGroupDef tag. In this XML stream, both operands are data elements, as defined by the XML schema shown in TABLES 2 and 6. Thus, in this XML stream, the first operand is data unit with DataID 1011; the second operand is data unit with DataID 1211; and adding the two operands performs the operation.

TABLE 13 operation: DataID 1011 + DataID 1211.

```
<operationGroupElement>
    <kindofOperation>addition</kindofOperation>
    <OperationElement>1011</OperationElement>
    <OperationElement>1211</OperationElement>
</operationGroupElement>
```

TABLE 14 shows an exemplary XML stream for performing an operation "((DataID 1221)/90.3)+((DataID 20021)*(DataID 2001))." This operation includes three operative steps. The first step of the operation involves dividing data unit DataID 1221 by the real number 90.3. The second step of the operation multiplies data unit DataID 20021 by data unit DataID 2001. The first step and second step can be performed in reverse order and that operation precedence happens implicitly because of the way that the schema tags encapsulate the individual operations. The third step of the operation adds the result from the first step of the operation and the result from the second step of the operation.

TABLE 14 operation: ((Data ID 1221)/90.3) + ((DataID 20021)*(DataID 2001)).

```
<operationDef>
  <kindofOperation>addition</kindofOperation>
  <SubOperation>
    <kindofOperation>division</kindofOperation>
    <OperationElement>1221</firstOperationElement>
    <Real>90.3</secondReal>
  </SubOperation>
  <SubOperation>
    <kindofOperation>multiplication</kindofOperation>
    <OperationElement>20021</firstOperation Element>
    <OperationElement>2001</secondOperation Element>
  </SubOperation>
</operationDef>
```

TABLE 15 shows an exemplary XML stream for performing an operation "DataID 1221−(DataID 1332+DataID 1552)." This operation includes two operative steps. The first step of the operation involves adding data unit DataID 1332 and data unit DataID 1552. The second step of the operation adds data units DataID 1221 with the result of the first step of the operation.

TABLE 15 operation: DataID 1221 - (DataID 1332 + DataID 1552)

```
<operationDef>
  <kindofOperation>subtraction</kindofOperation>
  <OperationElement>1221</OperationElement>
  <SubOperation>
    <kindofOperation>addition</kindofOperation>
    <OperationElement>1332</OperationElement>
    <OperationElement>1552</OperationElement>
  </SubOperation>
</operationDef>
```

To further illustrate the present invention, TABLE 16 shows an exemplary XML schema that defines a set of primitives and a set of operations that may be performed on those primitives by XML streams that conform to the schema.

TABLE 15

```
<?xml version="1.0" encoding="utf-8"?>
<xsd:schema xmlns:xsd="http://www.w3.org/2001/XMLSchema"
xmlns:xsi="http://www.w3.org/2000/10/XMLSchema-instance">
<!-- data identifier (data access is abstracted, this is just the access key)
-->
  <xsd:simpleType name="dataIDDef">
    <xsd:restriction base="xsd:string">
      <xsd:pattern value="\p{N}+"/>
    </xsd:restriction>
  </xsd:simpleType>
  <!-- kind of operation, limited to basic arithmetic ops -->
  <xsd:simpleType name="kindofOperationDef">
    <xsd:restriction base="xsd:string">
      <xsd:pattern value="addition"/>
      <xsd:pattern value="subtraction"/>
      <xsd:pattern value="multiplication"/>
      <xsd:pattern value="division"/>
    </xsd:restriction>
  </xsd:simpleType>
  <!-- a dataset is defined as a group of dataIDs that has a defined operation -->
```

TABLE 15-continued

```
  <!-- applied to the group prior to applying any operations to the
group as a whole -->
  <xsd:complexType name="dataIDSetDef">
    <xsd:sequence>
      <xsd:element name="setOperation" type="kindofOperationDef"/>
      <xsd:element name="setMember" type="dataIDDef"
maxOccurs="unbounded"/>
    </xsd:sequence>
  </xsd:complexType>
  <!-- the simplest type of data collection is one where the →
  <!-- contents of the data collection -->
  <!-- are summed prior to group operation. This type of data
collection →
  <!-- has no explicit setOperation element because       -->
  <!-- the setOperation is restricted to addition -->
  <xsd:complexType name="summedDataIDSetDef">
    <xsd:complexContent>
      <xsd:restriction base="dataIDSetDef">
        <xsd:sequence>
          <xsd:element name="setMember" type="dataIDDef"/>
        </xsd:sequence>
      </xsd:restriction>
    </xsd:complexContent>
  </xsd:complexType>
  <!-- all combos of element, summedElementSet, subOperations,
reals -->
  <!-- extend this for different element sets if necessary -->
  <xsd:element name="kindofOperation" type="kindofOperationDef"/>
  <xsd:element name="OperationElement" type="dataIDDef"/>
  <xsd:element name="OperationSet" type="summedDataIDSetDef"/>
  <xsd:element name="SubOperation" type="operationDef"/>
  <xsd:element name="Real" type="xsd:double"/>
  <!-- operationDef: combinations of elements in basic operations. Note
recursive nesting of Operations is allowed. -->
  <xsd:complexType name="operationDef">
    <xsd:sequence>
      <xsd:element ref="kindofOperation"/>
      <xsd:choice>
        <xsd:sequence>
          <xsd:element ref="OperationElement"/>
          <xsd:element ref="OperationElement"/>
        <xsd:sequence>
        <xsd:sequence>
          <xsd:element ref="OperationSet"/>
          <xsd:element ref="OperationSet"/>
        <xsd:sequence>
        <xsd:sequence>
          <xsd:element ref="SubOperation"/>
          <xsd:element ref="SubOperation"/>
        <xsd:sequence>
        <xsd:sequence>
          <xsd:element ref="Real"/>
          <xsd:element ref="Real"/>
        <xsd:sequence>
        <xsd:sequence>
          <xsd:element ref="OperationElement"/>
          <xsd:element ref="OperationSet"/>
        <xsd:sequence>
        <xsd:sequence>
          <xsd:element ref="Operation Element"/>
          <xsd:element ref="SubOperation"/>
        <xsd:sequence>
        <xsd:sequence>
          <xsd:element ref="Operation Element"/>
          <xsd:element ref="Real"/>
        <xsd:sequence>
        <xsd:sequence>
          <xsd:element ref="OperationSet"/>
          <xsd:element ref="OperationElement"/>
        </xsd:sequence>
        <xsd:sequence>
          <xsd:element ref="OperationSet"/>
          <xsd:element ref="SubOperation"/>
        </xsd:sequence>
        <xsd:sequence>
          <xsd:element ref="OperationSet"/>
          <xsd:element ref="Real"/>
        </xsd :sequence>
        <xsd:sequence>
```

TABLE 15-continued

```
        <xsd:element ref="SubOperation"/>
        <xsd:element ref="OperationElement"/>
      </xsd:sequence>
      <xsd:sequence>
        <xsd:element ref="SubOperation"/>
        <xsd:element ref="OperationSet"/>
      </xsd:sequence>
      <xsd:sequence>
        <xsd:element ref="SubOperation"/>
        <xsd:element ref="Real"/>
      </xsd:sequence>
      <xsd:sequence>
        <xsd:element ref="Real"/>
        <xsd:element ref="OperationElement"/>
      </xsd sequence>
      <xsd:sequence>
        <xsd:element ref="Real"/>
        <xsd:element ref="OperationSet"/>
      </xsd:sequence>
      <xsd:sequence>
        <xsd:element ref="Real"/>
        <xsd:element ref="SubOperation"/>
      </xsd:sequence>
    </xsd:choice>
  </xsd:sequence>
</xsd:complexType>
<xsd:complexType name="operationGroupDef">
  <xsd:sequence>
    <xsd:element name="operationGroupElement"
type="operationDef"
maxOccurs="unbounded"/>
  </xsd:sequence>
</xsd:complexType>
<!-- standalone element definitions -->
<xsd:element name="dataIDElement" type="dataIDDef"/>
<xsd:element name="dataIDSet" type="dataIDSetDef"/>
<xsd element name="summedDataIDSet"
type="summedDataIDSetDef"/>
<xsd:element name="operation" type="operationDef"/>
<xsd:element name="operationGroup" type="operationGroupDef"/>
</xsd:schema>
```

The above specification and examples provide a complete description of the invention. Since many embodiments of the invention can be made without departing from the spirit and scope of the invention, the invention resides in the claims hereinafter appended.

What is claimed is:

1. A method for using an extensible markup language (XML) stream for at least one of operating on and using data in which the XML stream is defined according to a an XML schema, comprising:
   providing an XML stream with one or more portions defining a restrictive set of arithmetic operations that may be performed on data wherein the restrictive set of arithmetic operations include operative steps defined in an XML schema, wherein the operative steps comprising one or more of addition, subtraction, multiplication, and division;
   incorporating an operation that includes at least one of the operative steps into an XML stream that conforms to the XML schema;
   passing the XML stream to an operation parser, the operation parser performing processes including:
   receiving the XML stream;
   receiving the data;
   applying the restrictive set of arithmetic operations included in the XML stream to the data to reduce the overall amount of content included in the data; and
   output a result of applying the XML stream to the data as modified data.

2. The method in claim 1, wherein applying the XML stream to the data further comprises performing the operation on operands associated with the data.

3. The method in claim 2, further comprising defining element types in the XML schema, wherein each of the operands is one of the defined element types.

4. The method in claim 3, wherein the element types comprises operations, data, dataset, and real numbers.

5. The method in claim 3, wherein one of the operands is a dataset element having data units.

6. The method in claim 5, further comprising:
   defining a pre-operation for performing on the data units, wherein the pre-operation includes pre-operative steps consisting of addition, subtraction, multiplication, and division; and
   performing the pre-operation on the data units before performing the operation on the operand.

7. The method in claim 6, wherein the pre-operation is restricted to addition.

8. A computer-readable storage medium storing a data structure corresponding to a schema that describes one or more functional relationships amongst information represented in the schema, the medium comprising:
   an extensible markup language (XML) schema expressed as an XML stream with one or more portions defining one or more of a restrictive set of arithmetic operations that may be performed on wherein the restrictive set of arithmetic operations defining operative steps for incorporating into an operation within the XML stream, wherein the operative steps comprise one or more of addition, subtraction, multiplication, and division; and
   instructions for passing the XML stream to an operational parser and directing the operational parser to:
   receive the data;
   apply the one or more of the restrictive set of arithmetic operations to the data; and
   output a result of applying the XML stream to the data as modified data, the overall amount of content included in the modified data being less when the restrictive set of arithmetic operations are included.

9. The computer-readable medium of claim 8, wherein the operation is performed on operands associated with data.

10. The computer-readable medium of claim 9, wherein the XML schema further defines element types, wherein each of the operands is one of the defined element types.

11. The computer-readable medium of claim 10, wherein the element types comprise operations, data, dataset, and real numbers.

12. The computer-readable medium of claim 11, wherein one of the operands is a dataset element having data units.

13. The computer-readable medium of claim 12, wherein the XML schema further defines a pre-operation for performing on the data units, wherein the pre-operation includes preoperative steps consisting of addition, subtraction, multiplication, and division.

14. The computer-readable medium of claim 13, wherein the pre-operation is restricted to addition.

15. A method for using an extensible markup language (XML) parser for operating on and using data corresponding to an XML schema, comprising:
   receiving data that is to be at least one of operated on and used;
   expressing an XML schema as an XML stream;
   receiving the XML stream containing computer executable instructions, which are interpreted by one or more processing systems to define a restrictive set of operative steps of arithmetic operations that may be performed on data;

parsing the computer executable instructions to obtain the operative steps defined in the XML schema, wherein the operative steps comprise one or more of addition, subtraction, multiplication and division, and are included in the XML stream to reduce the overall amount of content in the data; and executing one or more of the operative steps on the data in the XML stream to reduce the overall amount of content in the data to yield modified data.

16. The method in claim 15, wherein the operative steps are performed on operands associated with the data.

17. The method in claim 16, wherein each operand is of one of element types defined by the XML schema.

18. The method in claim 17, wherein the element types include operations, data, dataset, and real numbers.

19. The method in claim 18, wherein one of the operands is a dataset element that includes data units.

20. The method in claim 19, wherein the XML schema further defines pre-operative steps for performing on the data units, wherein the pre-operative steps consist of addition, subtraction, multiplication, and division.

21. The method in claim 20, wherein the pre-operative steps are restricted to addition.

22. A system for operating on data and using data corresponding to an extensible markup language (XML) schema, comprising:

a data source providing data;

an XML source producing an XML stream from the XML schema, the XML stream including with one or more portions defining a restrictive set of arithmetic operations that may be performed on content in XML data, the restrictive set of arithmetic operations defining one or more operative steps in the XML schema, wherein the operative steps comprise one or more of addition, subtraction, multiplication, and division; and a parser:
  receiving the data from the data source;
  receiving the XML stream;
  applying the one or more operative steps included in the XML stream to the data; and
  outputting modified data in which the overall amount of content in the modified data is reduced as compared to the data.

* * * * *